United States Patent
Lange et al.

(10) Patent No.: US 6,519,940 B2
(45) Date of Patent: Feb. 18, 2003

(54) MASTER CYLINDER FOR A HYDRAULIC VEHICLE BRAKING SYSTEM WITH IMPROVED RETURN SPRING RESTRAINING

(75) Inventors: Hans-Christoph Lange, Mülheim-Kärlich (DE); Peter Linde, Weitersburg (DE); Martin Struschka, Lahnstein (DE); Hartmut Unterberg, Koblenz (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/907,269

(22) Filed: Jul. 17, 2001

(65) Prior Publication Data

US 2001/0049941 A1 Dec. 13, 2001

Related U.S. Application Data

(63) Continuation of application No. PCT/EP00/00585, filed on Jan. 26, 2000.

(30) Foreign Application Priority Data

Jan. 26, 1999 (DE) .......................................... 199 03 014

(51) Int. Cl.$^7$ ................................................. B60T 11/20
(52) U.S. Cl. .......................................... 60/562; 92/135
(58) Field of Search ............................... 60/562; 92/135

(56) References Cited

U.S. PATENT DOCUMENTS

| 3,686,866 A | 8/1972 | Blount |
|---|---|---|
| 3,839,867 A | 10/1974 | Shellhause |
| 4,004,425 A | 1/1977 | Pickering |
| 5,279,125 A | 1/1994 | Keyes et al. |

FOREIGN PATENT DOCUMENTS

| DE | 19520670 | 6/1995 |
|---|---|---|
| EP | 0095404 | 5/1983 |

*Primary Examiner*—Edward K. Look
*Assistant Examiner*—Michael Leslie
(74) *Attorney, Agent, or Firm*—MacMillan, Sobanski & Todd, LLC

(57) ABSTRACT

A master cylinder includes a restraining device arranged between the first and second pistons for preventing the return spring from being compressed and expanded beyond a certain extent. The restraining device includes a first, substantially sleeve-shaped component and a second, substantially pin-shaped component. The pin-shaped component includes a flange which projects radially outwards. The sleeve-shaped component includes a first receiving flange which positively interacts with the flange of the pin-shaped component. The sleeve-shaped component includes at least one introduction opening which enables the flange on the pin-shaped component to be laterally introduced into the sleeve-shaped component. The end of the sleeve-shaped component includes a second receiving flange which positively interacts with a flanged projection on the second piston which projects radially outwards. The sleeve-shaped component includes the at least one introduction opening which enables the flange provided on the second piston to be laterally introduced into the sleeve-shaped component.

14 Claims, 4 Drawing Sheets

MASTER CYLINDER FOR A HYDRAULIC VEHICLE BRAKING SYSTEM WITH IMPROVED RETURN SPRING RESTRAINING

CROSS REFERENCE TO RELATED APPLICATIONS

This application is a continuation of International Application No. PCT/EP00/00585 filed Jan. 26, 2000, which claims priority to German Patent Application No. 19903014.6 filed Jan. 26, 1999.

BACKGROUND OF THE INVENTION

The invention relates to a master cylinder for a hydraulic vehicle braking system with a housing and a bore formed therein, in which bore a first piston and a second piston, which is arranged at an axial distance from the first piston, are carried in a sealing and displaceable manner, and with a restraining device, which is arranged between the first piston and the second piston, for a return spring of the first piston, which device prevents the return spring from being compressed and expanded beyond a certain extent. Master cylinders of this kind, which are also called transmitter cylinders, are used in a vast number of cases and are known, for example, from DE 195 20 670 A1.

The restraining device for the return spring of the first piston ensures on the one hand that a defined distance between the two pistons is re-established when the master cylinder is relieved of pressure, so that the two pistons are accurately positioned relative to one another in their rest position, and on the other that, should a pressure loss occur in the primary pressure chamber, on which the first piston acts, of the master cylinder due, for example, to a leak, a brake pressure is built up as quickly as possible in the secondary pressure chamber, which may still be operative and on which the second piston acts, by the restraining device producing a rigid through-drive between the first piston and the second piston (fail safe function) after the return spring of the first piston has been compressed beyond a predetermined value.

Known restraining devices of the described type are of a relatively complicated structure and take a long time to assemble. For example, the restraining device known from DE 195 20 670 A1 consists of two sheet-metal sleeves which are of a U-shaped cross section and are connected together by a spacer pin. At one end this spacer pin has a widened head, which positively interacts with one sheet-metal sleeve. The spacer pin is connected to the other sheet-metal sleeve by placing an annular fixing element on the corresponding end of the spacer pin and then riveting the fixing element to the spacer pin by deforming the part of the latter which still protrudes. This can only take place after the restraining device has been assembled, and the restrained return spring must also be significantly compressed by a separate appliance, as the end of the spacer pin must project out of the sheet-metal sleeve in order to carry out the riveting process. Moreover, this kind of fixing process results in considerable tolerances on the length of the restraining devices.

SUMMARY OF THE INVENTION

The object of the invention is to provide a master cylinder whose restraining device is simple to produce and easy to assemble and which also has improved accuracy of length.

This object is achieved according to the invention by a master cylinder whose restraining device has the features presented in claim 1. In contrast to the prior art, the restraining device of the master cylinder according to the invention only consists of two components, a first, substantially sleeve-shaped component and a second, substantially pin-shaped component. These two components can be coupled together by a simple joining action though the flange on the pin-like component and the first receiving flange, which interacts with the latter flange, on the sleeve-shaped component as well as the lateral introduction opening in the sleeve-shaped component, which communicates with the open region of the first receiving flange.

The introduction opening in the circumferential surface area of the sleeve-shaped component, which must be of a size at least at one point such that the flange provided on the pin-shaped component fits through it, may be arranged either near or even adjacent to the open region of the receiving flange or else remote therefrom. If the introduction opening is axially remote from the receiving flange, the opening cross section of the cut-out, which connects the introduction opening to the receiving flange, in the circumferential surface area of the sleeve-shaped component may be designed smaller than the opening cross section of the introduction opening, thus providing lateral guidance for the flange of the pin-shaped component which is inserted in the sleeve-shaped component, this guidance preventing the flange from being pushed out of the sleeve-shaped component.

According to a preferred development of the master cylinder according to the invention, the end of the sleeve-shaped component which is remote from the pin-shaped component comprises a second, U-shaped receiving flange which projects radially inwards and which positively interacts with a flange on the second piston which projects radially outwards. In order that the flange provided on the second piston may be joined to the sleeve-shaped component, the latter comprises in its circumferential surface area an introduction opening which communicates with the open region of the second receiving flange and which enables the flange to be laterally introduced into the sleeve-shaped component. If the introduction opening described above, which is axially remote from the first receiving flange, is arranged adjacent to the second receiving flange, then this introduction opening may serve to introduce both the flange provided on the pin-shaped component and the flange provided on the second piston into the sleeve-shaped component (in this order).

It is, however, also possible to provide two introduction openings in the sleeve-shaped component, one of which communicates with the open region of the:first receiving flange and the second of which communicates with the open region of the receiving flange. These two introduction openings may be arranged on the same side or on opposite sides of the sleeve-shaped component.

The two U-shaped receiving flanges may similarly open towards the same side or towards opposite sides of the sleeve-shaped component. If both receiving flanges open towards the same side of the sleeve-shaped component, then—according to one embodiment of the restraining device of the master cylinder according to the invention—a single introduction opening extends in the circumferential surface area of the sleeve-shaped component from the open region of the first receiving flange to the open region of the second receiving flange. In another embodiment, in which the two receiving flanges likewise open towards the same side of the sleeve-shaped component, there are two introduction openings which are separated from one another by a portion of the circumferential surface of the sleeve-shaped component. This circumferential surface portion improves the stability of the sleeve-shaped component and at the same time represents a lateral guide for the flange provided on the pin-shaped component when it is introduced into the sleeve-shaped component and the return spring is compressed.

In all embodiments of the master cylinder according to the invention the first U-shaped receiving flange or the second U-shaped receiving flange or even both receiving flanges of the sleeve-shaped component may each comprise one or more latching projections which, after the pin-shaped component has been joined to the first receiving flange or the flange provided on the second piston has been joined to the second receiving flange, prevent(s) or at least oppose(s) an automatic disengagement of the established connection in the lateral direction.

The circumferential surface of the sleeve-shaped component may also comprise one or more apertures in all embodiments of the master cylinder according to the invention in order to improve the flow of hydraulic fluid through the restraining device. This kind of formation makes it easier to fill the above-mentioned primary pressure chamber of the master cylinder, in which the restraining device is located, with hydraulic fluid. In the extreme case the sleeve-shaped component may be reduced to its two receiving flanges and a plurality (at least two) of axial web-shaped connections between these two receiving flanges. The web-shaped connections between the two receiving flanges are then arranged so as to ensure that the sleeve-shaped component is sufficiently stable.

According to one development, in all embodiments the pin-shaped component may comprise, at its end which is remote from the sleeve-shaped component, a bore which is entered by a stud, bonded or welded to this bore, of a spring holding head. This kind of formation of the pin-shaped component enables the maximum length of the restraining device to be adjusted with utmost accuracy and then fixed when assembling the restraining device.

DETAILED DESCRIPTION OF THE INVENTION

Figure 1:
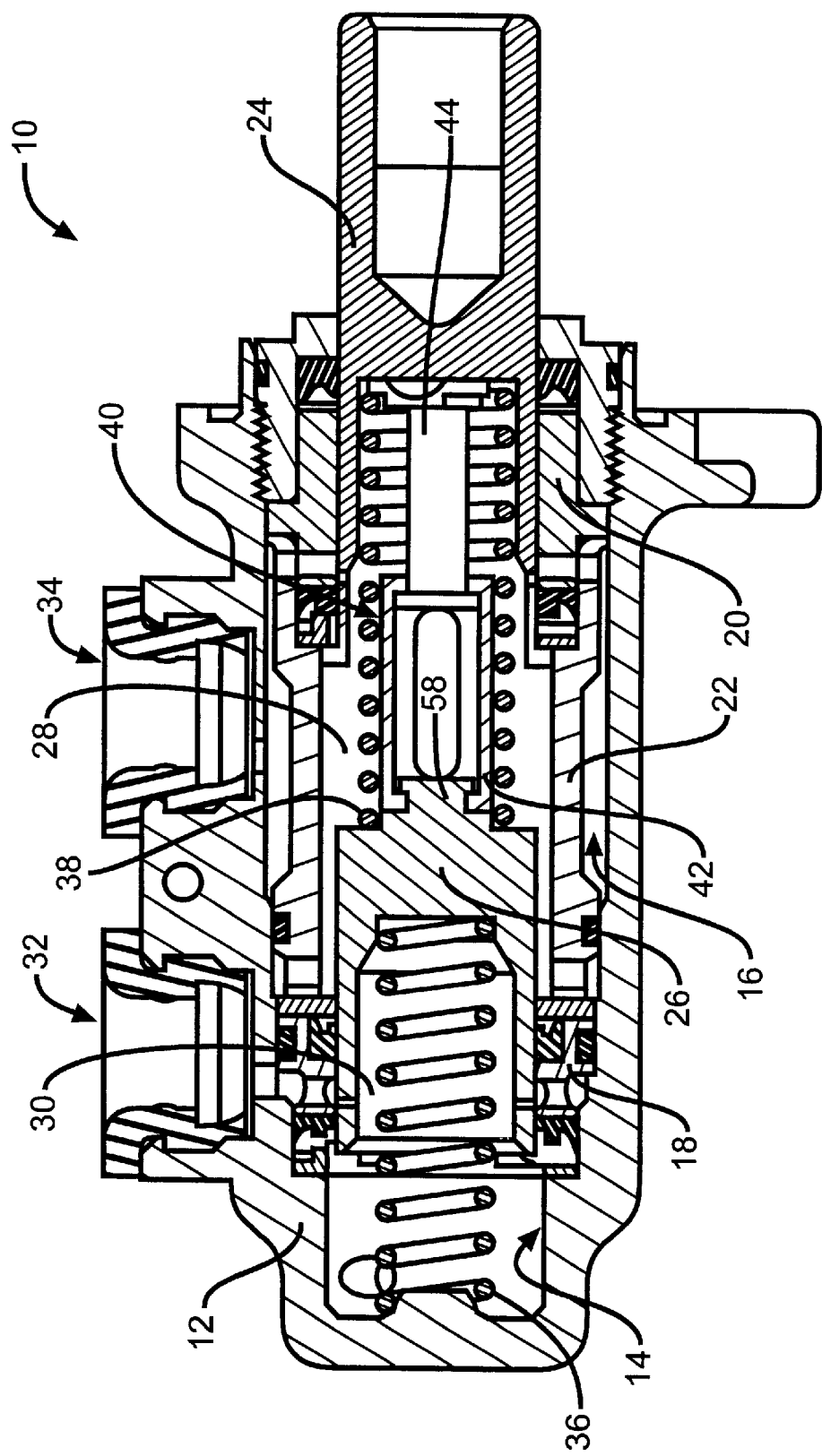
FIG. 1 is a longitudinal section of a first embodiment of a master cylinder according to the invention.

FIG. 1 shows a master cylinder 10, which is also called a master brake cylinder, for a hydraulic vehicle braking system.

The master cylinder 10 has a housing 12 with a bore 14, which is stepped here and in which a spacer housing 16 is inserted, the latter consisting substantially of two clamping rings 18 and 20 as well as a spacer sleeve 22, arranged between the rings, and carrying two axially spaced pistons 24 and 26 in a sealing and displaceable manner.

The first piston 24 acts on a primary pressure chamber 28 to produce pressure, while the second piston 26 acts on a secondary pressure chamber 30. When the master cylinder 10 is ready to operate both the primary pressure chamber 28 and the secondary pressure chamber 30 are completely filled with hydraulic fluid, which passes from a hydraulic fluid reservoir, which is not shown, through connection openings 32 and 34 in the housing 12 of the master cylinder 10 and further through bores, which are not illustrated in detail here, in the clamping rings 18 and 20 and the two pistons 24 and 26 into the primary pressure chamber 28 and the secondary pressure chamber 30, respectively.

A return spring 36, which is supported at the bottom of the bore 14 and preloads the second piston 26 into its starting or rest position, and a return spring 38, which is supported on the opposite side of the second piston 26 and preloads the first piston 24 into its starting or rest position, serve to return the two pistons 24 and 26 to their rest position. The latter return spring 38 is restrained by means of a restraining device 40, which prevents the return spring 38 from being compressed and expanded beyond a certain, prefixed extent.

Figure 2:
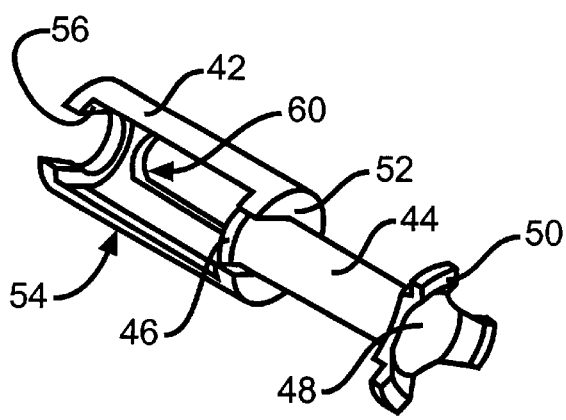
FIG. 2 is a perspective representation of the restraining device shown in FIG. 1 for the return spring of the first piston.

The restraining device 40, the structure of which is shown more precisely in FIG. 2, is clamped directly between the two pistons 24 and 26 in the illustrated embodiment. It consists of a first, substantially sleeve-shaped component 42 and a second, substantially pin-shaped component 44, which is connected to the latter such that it can be disengaged. In order to connect it to the sleeve-shaped component 42, the pin-shaped component 44 comprises at one end a circular disc-shaped flange 46, which projects radially outwards and which in the represented embodiment is integral with the pin-shaped component 44. At its opposite end the pin-shaped component 44 is provided with a spring holding head, which is generally indicated by 48 and which according to the embodiment of FIGS. 1 and 2 is reduced to three arms 50 extending radially outwards. One end of the return spring 38 is supported at the spring holding head 48 or at the arms 50 thereof, while the other end is supported at the second piston 26 in the represented embodiments. Diverging from the embodiments illustrated here, the sleeve-shaped component 42 may also comprise a spring holding head at its end which faces the second piston 26.

The sleeve-shaped component 42 is provided at its end which is turned towards the pin-shaped component 44 with a first, U-shaped receiving flange 52, which projects radially inwards and to is intended to interact with the flange 46 of the pin-shaped component 44. In order that the pin-shaped component 44 and, in particular, its flange 46, may be joined to the sleeve-shaped component 42, the latter comprises in its circumferential surface area an introduction opening 54 which communicates with the open region of the U-shaped receiving flange 52 and the opening cross section of which is dimensioned at least at one point such that the flange 46 of the pin-shaped component 44 can be introduced from the side through the introduction opening 54 into the sleeve-shaped component 42. In the embodiment of FIG. 2 the introduction opening 54 extends over the entire length of the sleeve-shaped component 52, so that the flange 46 can be introduced into the sleeve-shaped component 42 at any desired point of its extent.

Once the flange 46 formed on the pin-shaped component 44 has been introduced into the sleeve-shaped component 42 as reproduced in FIG. 2, the two components 42 and 44 can be displaced relative to one another in the axial direction. However as soon as the flange 46 comes into contact with the receiving flange 52, the form-fit which is produced by the two flanges 46, 52 prevents the two components 42 and 44 from moving further apart in the axial direction.

In order that the restraining device 40 may be easily fastened to the second piston 26, the sleeve-shaped component 42 comprises at its end which is turned towards the second piston 26 a second U-shaped receiving flange 56, which projects radially inwards and which is intended to interact with a circular disc-shaped flange 58 formed on the second piston 26.

According to FIG. 2, both receiving flanges 52 and 56 open towards the same side of the sleeve-shaped component 42, so that the flange 58 of the second piston 26 as well as the flange 46 on the pin-shaped component 44 can be introduced through the introduction opening 54 into the sleeve-shaped component 42.

As represented in FIG. 1, the flange 58 on the second piston 26 is formed such that, after being joined to the sleeve-shaped component 42, there is no possibility of any further axial relative movement taking place between the sleeve-shaped component 42 and the second piston 26.

In order to improve the flow of hydraulic fluid through the sleeve-shaped component 42, the latter comprises an elongate aperture 60 in its circumferential surface area lying opposite the introduction opening 54.

Figure 3A:
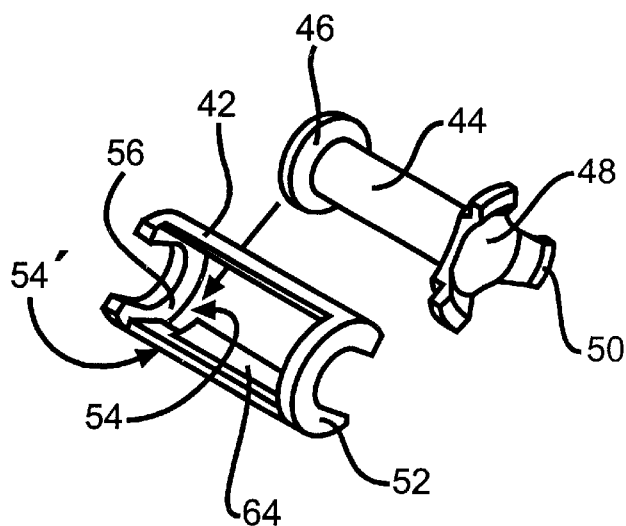
FIGS. 3a–3c are perspective representations of a modified embodiment of the restraining device from FIG. 1 and the assembly thereof.
Figure 3B:
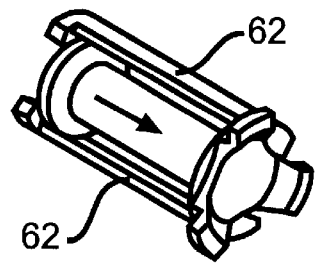
Figure 3C:
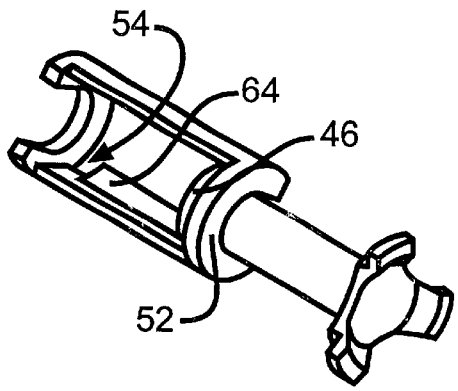

FIGS. 3a to 3c show a modified embodiment of the sleeve-shaped component 42, in which the two receiving flanges 52 and 56 open towards opposite sides of the sleeve-shaped component 42. The sleeve-shaped component 42 itself is reduced to two axially extending webs 62, to the ends of which the two receiving flanges 52 and 56 are integrally attached. Whereas an introduction opening 54' extending over the entire length of the sleeve-shaped component 42 is associated with the second receiving flange 56, similarly to the embodiment represented in FIG. 2, the introduction opening 54 associated with the first receiving flange 52 is arranged adjacent to the second receiving flange 56. A strip-shaped extension 64, which is integrally formed on one web 62, reduces the opening cross section over the rest of the extent of the sleeve-shaped component 42 such that the flange 46 does not fit through the opening cross section remaining in the circumferential surface area of the sleeve-shaped component 42. After the flange 46 has been introduced through the introduction opening 54 into the sleeve-shaped component 42, the strip-shaped extension 64 thus ensures that the flange 46 is guided laterally and also prevents the flange 46 from being pushed laterally out of the sleeve-shaped component 42.

Figure 4:
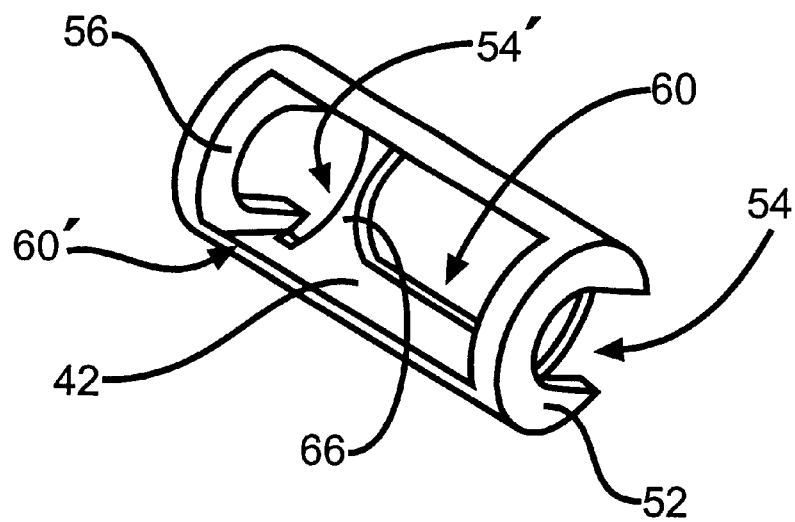
FIG. 4 is a perspective representation of a further modified embodiment of a part of the restraining device from FIG. 1.

In the further modification of the sleeve-shaped component 42 which is represented in FIG. 4 the two receiving flanges 52 and 56 again open towards the same side, although an individual introduction opening 54 and 54', respectively, is associated with each receiving flange 52, 56. The two introduction openings 54, 54' are separated from one another by a circumferential surface portion 66 of the sleeve-shaped component 42 which is provided with an aperture 60 and, similarly to the strip-shaped extension 64, provides improved lateral guidance for the flange 46. A further, even larger aperture 60' is provided in addition to the aperture 60 and opposite the latter.

Figure 5:
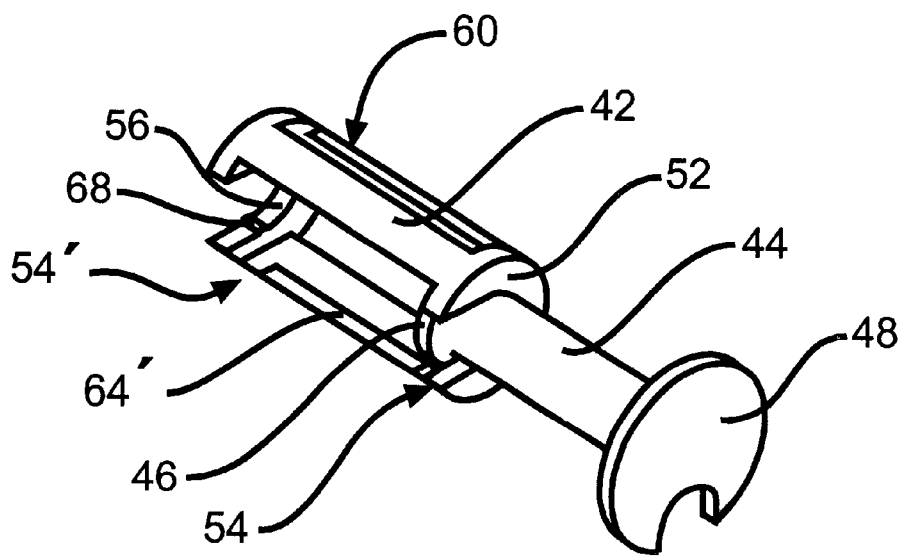
FIG. 5 is a perspective representation of a further embodiment of the restraining device from FIG. 1.

In the embodiment of the restraining device 40 which is shown in FIG. 5 both receiving flanges 52, 56 again open towards the same side of the sleeve-shaped component 42. Just as in the case of the embodiment which is represented in FIG. 4, an individual introduction opening 54 and 54', respectively, is associated with each receiving flange 52, 56, although these two introduction openings 54, 54' are not completely separated from one another as in FIG. 4, instead being defined just by a strip-shaped extension 64', although otherwise communicating with one another via a cut-out in the circumferential surface area of the sleeve-shaped component 42. In order also to at least make it more difficult for the two components 42 and 44 to slide apart laterally at the points where there is no strip-shaped extension 64', each receiving flange 52 and 56 is provided with two latching projections 68, the resistance of which must be overcome when introducing the pin-shaped component 44 or the flange 58 provided on the second piston 26 into the sleeve-shaped component 42 from the side.

Figure 6:
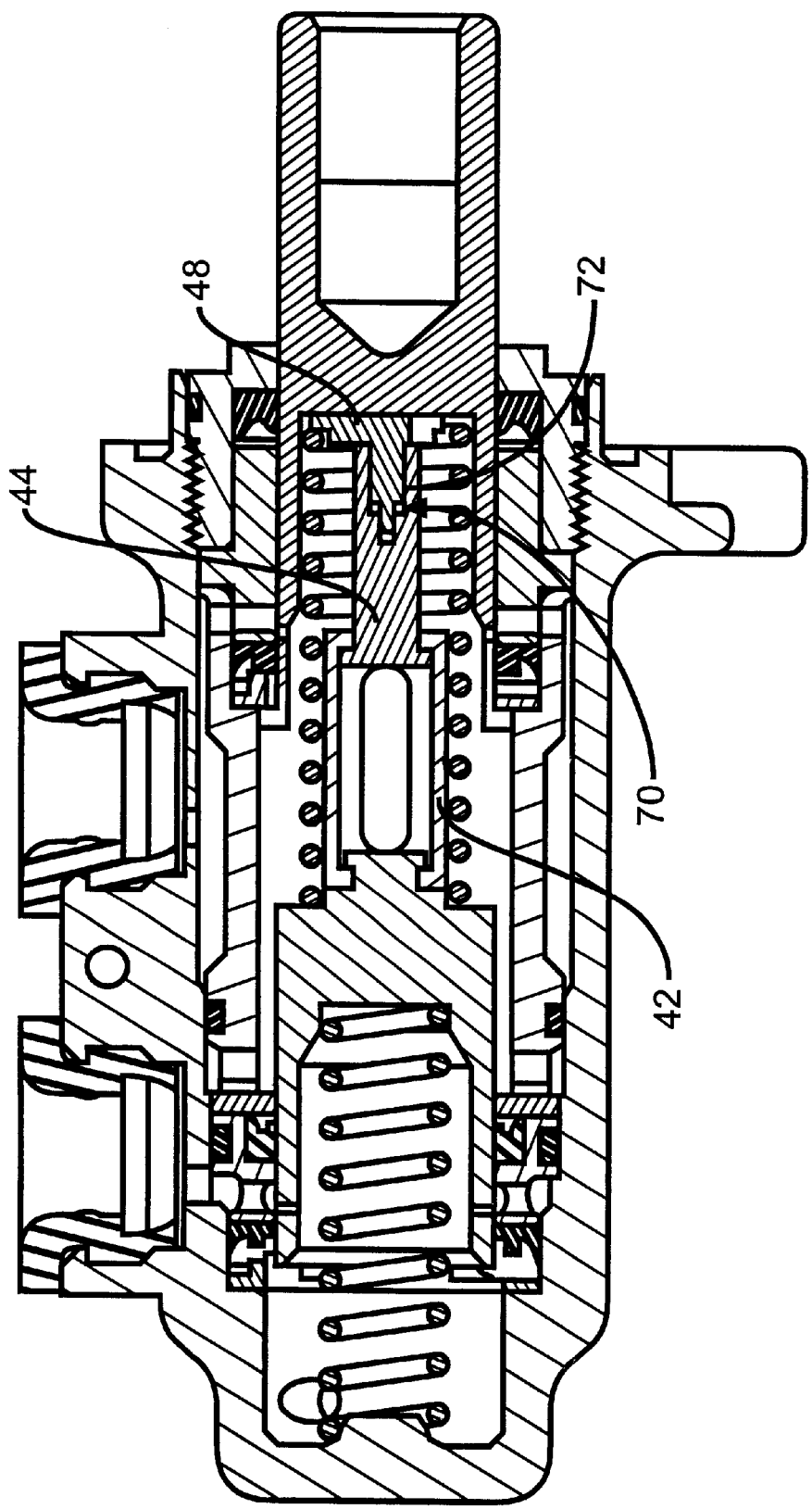
FIG. 6 is a view similar to FIG. 1 with a restraining device of an adjustable length.

Finally, FIG. 6 shows an embodiment of the restraining device 40 of an adjustable maximum length. For this purpose the pin-shaped component 44 is provided at its end which is remote from the sleeve-shaped component 42 with a bore 70, which is entered by a corresponding stud 72 of the spring holding head 48. Once the length of the pin-shaped component 44 has been adjusted as desired by the stud 72 entering the bore 70 to a varying depth, the stud 72 is bonded or welded, e.g. by ultrasound, in the bore 70, so that the spring holding head 58 is integrally connected to the rest of the pin-shaped component 44.

In all embodiments of the restraining device 40 the sleeve-shaped component 42 and/or the pin-shaped component 44 may consist of metal or of a suitable plastics material.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Master cylinder for a hydraulic vehicle braking system with a housing and a bate formed therein, in which bore a first piston and a second piston, which is arranged at an axial distance from the first piston, are guided in a sealing and displaceable manner, and a restraining device, which is arranged between the first piston and the second piston, for a return spring of the first piston, which device prevents the return spring from being compressed and expanded beyond a certain extent, wherein the restraining device comprises a first, substantially sleeve-shaped component and a second, substantially pin-shaped component which is connected to the first component such that it can be disengaged, wherein the pin-shaped component comprises at its end which faces the sleeve-shaped component a flange which projects radially outwards and the sleeve-shaped component comprises at its associated end a first receiving flange which projects radially inwards and which positively interacts with the flange projecting radially outwards from the pin-shaped component such that the first and second components cannot move apart in the axial direction, and wherein the sleeve-shaped component comprises in its circumferential surface area at least one introduction opening which enables the flange provided on the pin-shaped component to be laterally introduced into the sleeve-shaped component, wherein the end of the sleeve-shaped component which is remote from the pin-shaped component comprises a second receiving flange which projects radially inwards and which positively interacts with a flanged projection on the second piston which projects radially outwards such that the sleeve-shaped component and the second piston cannot move apart in the axial direction, and wherein the sleeve-shaped component includes the at least one introduction opening which enables the flange provided on the second piston to be laterally introduced into the sleeve-shaped component.

2. Master cylinder according to claim 1, wherein the sleeve shaped component comprises in its circumferential surface area first and second introduction openings, wherein the first introduction opening enables the flange provided on the pin-shaped component to be laterally introduced into the sleeve-shaped component, and wherein the second introduction opening enables the flanged projection provided on the second piston to be laterally introduced into the sleeve-shaped component.

3. Master cylinder according to claim 2, wherein the first introduction opening in the circumferential surface area of the sleeve-shaped component which communicates with the open region of the first receiving flange allows the flange provided on the pin-shaped component to be laterally introduced into the sleeve-shaped component only in a region which is axially remote from the first receiving flange.

4. Master cylinder according to claim 2, wherein the first receiving flange and the second receiving flange open towards the same side of the sleeve-shaped component.

5. Master cylinder according to claim 4, wherein the introduction opening extends in the circumferential surface area of the sleeve-shaped component from the open region of the first receiving flange to the open region of the second receiving flange.

6. Master cylinder according to claim 4, wherein a circumferential surface portion of the sleeve-shaped component separates the first and second introduction openings from one Another.

7. Master cylinder according to claim 2, wherein the first introduction opening communicates with the open region of the first receiving flange.

8. Master cylinder according to claim 2, wherein the second introduction opening communicates with the open region of the second receiving flange.

9. Master cylinder according to claim 1, wherein the first receiving flange and the second receiving flange open towards opposite sides of the sleeve-shaped component.

10. Master cylinder according to claim 1, wherein one of the first receiving flange and the second receiving flange comprises a latching projection which, after one of the first receiving flange has been joined to the pin-shaped component and the second receiving flange to the second piston, prevents an automatic disengagement of the established connection.

11. Master cylinder according to claim 1, wherein the circumferential surface of the sleeve-shaped component comprises one or more apertures.

12. Master cylinder according to claim 1, wherein the pin-shaped component comprises, at its end which is remote from the sleeve-shaped component, a bore which is entered by a stud, bonded or welded to the bore, of a spring holding head.

13. Master cylinder according to claim 1, wherein the first receiving flange is U-shaped.

14. Master cylinder according to claim 1, wherein the second receiving flange is U-shaped.

* * * * *